March 10, 1925.
R. P. CALLARD
APPARATUS FOR DIPPING SHEET GLASS
Filed Jan. 7, 1922
1,529,239
3 Sheets-Sheet 1
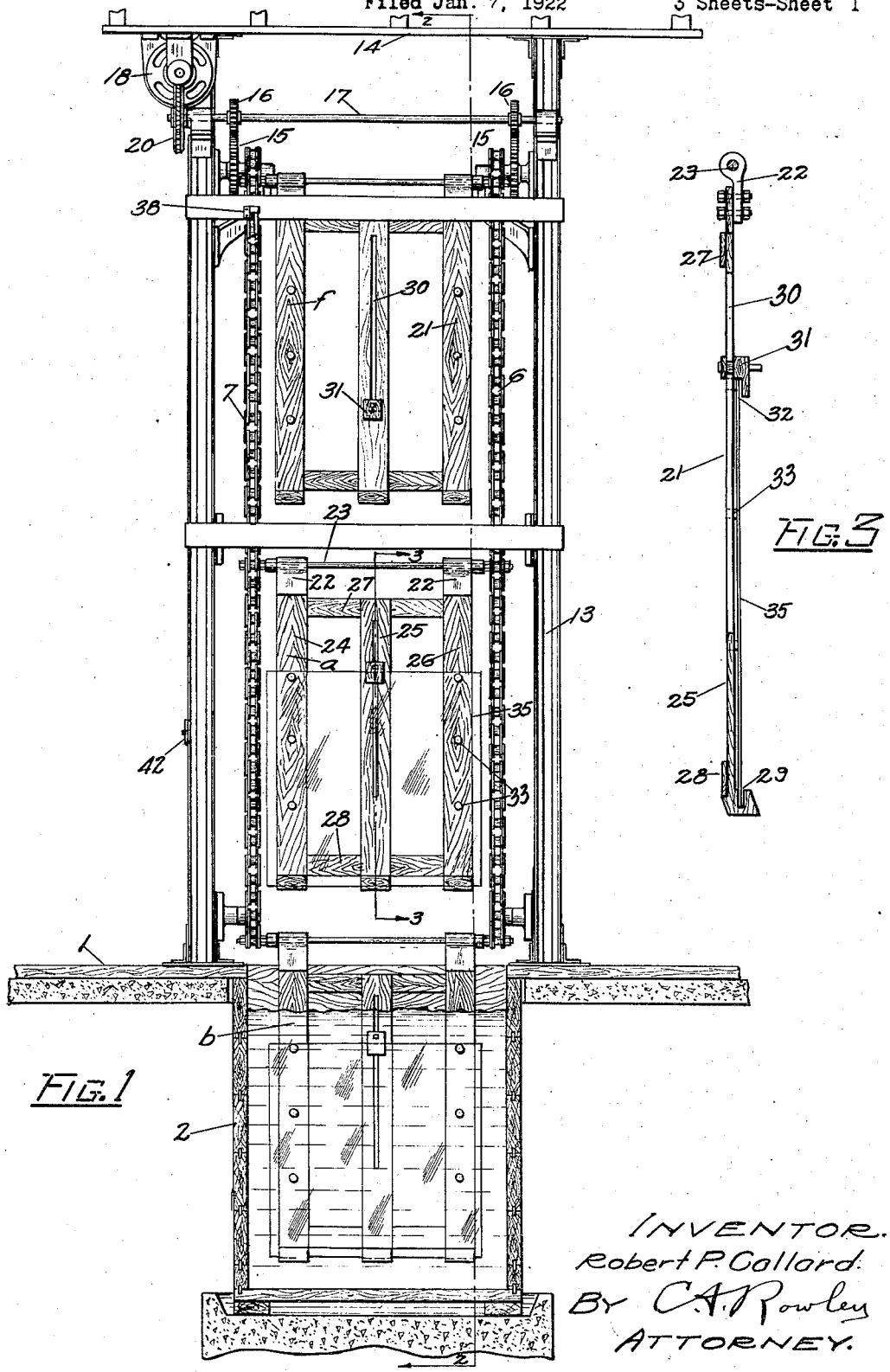

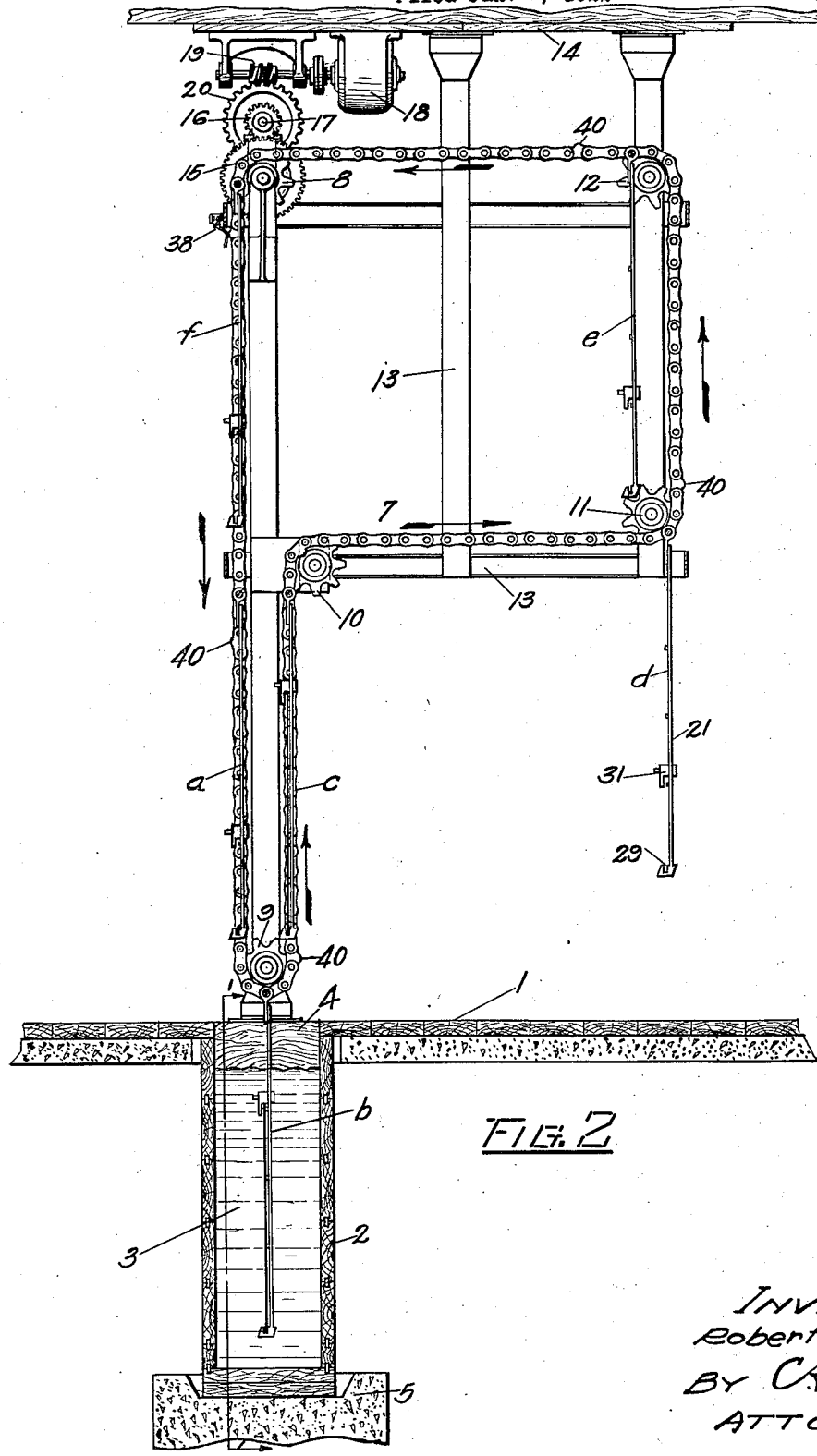

March 10, 1925.                                                    1,529,239
R. P. CALLARD
APPARATUS FOR DIPPING SHEET GLASS
Filed Jan. 7, 1922          3 Sheets-Sheet 3
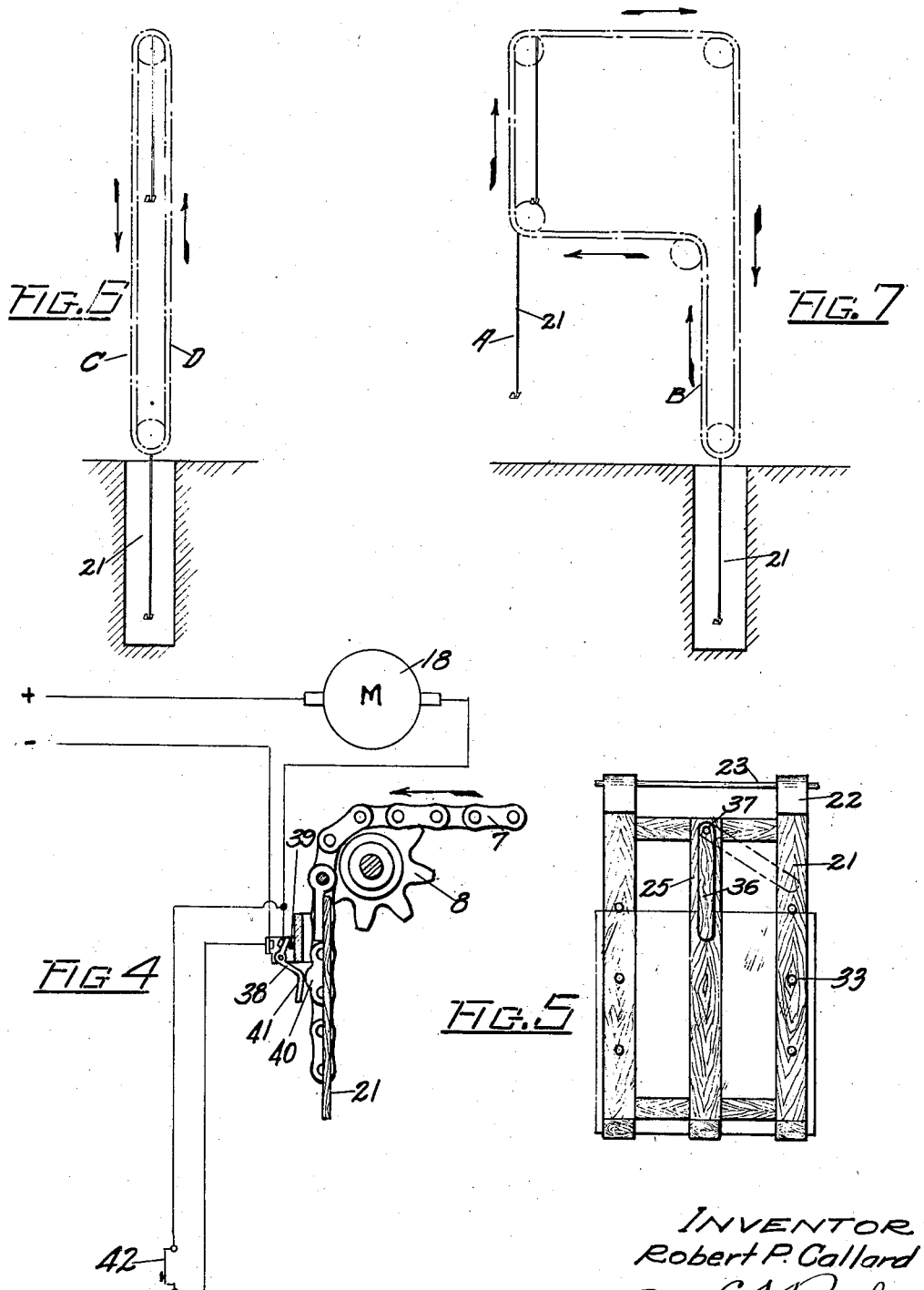
INVENTOR
Robert P. Callard
By C. A. Rowley
ATTORNEY Patented Mar. 10, 1925.

1,529,239

UNITED STATES PATENT OFFICE.

ROBERT P. CALLARD, OF CHARLESTON, WEST VIRGINIA, ASSIGNOR TO THE LIBBEY-OWENS SHEET GLASS COMPANY, OF TOLEDO, OHIO, A CORPORATION OF OHIO.

APPARATUS FOR DIPPING SHEET GLASS.

Application filed January 7, 1922. Serial No. 527,580.

*To all whom it may concern:*

Be it known that I, ROBERT P. CALLARD, a citizen of the United States, residing at Charleston, in the county of Kanawha and State of West Virginia, have invented new and useful Improvements in Apparatus for Dipping Sheet Glass, of which the following is a specification.

This invention relates to an apparatus for dipping sheet glass, and more specifically to an apparatus for automatically dipping sheets of drawn sheet-glass into an acid bath for removing the alkaline film that had developed thereon during the annealing process.

Drawn sheet glass, which is usually a soda-lime glass, is entirely insoluble in acid solutions, (excepting of course hydrofluoric acid). On the other hand, this glass is comparatively readily soluble in alkaline solutions. Now when soda-lime glasses are heated they develop or "sweat out" a thin but strongly alkaline surface film. Such a film is developed on the glass during the annealing process, and is present on the ribbon of glass when it emerges from the leer, and is cut up into sheet sections of appropriate sizes. This alkaline film has a great affinity for moisture, and the strong alkaline solution thus formed has a corroding action on the sheet surfaces, causing them to fade and lose their highly polished lustre. This action may take place while the sheets are packed for shipment, or stored in warehouses. To prevent this destructive action, the glass sheets are dipped in an acid solution to remove the alkaline film. This dipping should be done directly after the completion of the annealing process.

The object of the present invention is to provide a new and improved apparatus for rapidly and conveniently carrying out this dipping process. Specifically, the invention comprises an endless chain conveyor from which are hung a series of spaced sheet carriers. As the conveyor moves forward a sheet of glass is placed on each carrier, and the carriers are then successively lowered into the acid bath, and removed therefrom, the sheets being subsequently removed from the carriers and placed on a truck for removal to the cutting room. Further objects and details of the invention will become apparent from the following detailed description of an improved form of the invention.

In the accompanying drawings:

Fig. 1 is a front elevation of the dipping apparatus, the acid tank being shown in vertical section substantially on the line 1—1 of Fig. 2.

Fig. 2 is a vertical section, taken at right-angles to Fig. 1, substantially on the line 2—2 of Fig. 1.

Fig. 3 is a vertical section through one of the sheet carriers, taken substantially on the line 3—3 of Fig. 1.

Fig. 4 is a wiring diagram, illustrating one means for intermittently operating the driving motor to advance the conveyor step-by-step.

Fig. 5 is a front elevation of a modified form of sheet carrier.

Figs. 6 and 7 are diagrams illustrating alternative conveyor systems.

The floor level on which the glass producing machines, leers and cutting tables are located is indicated generally at 1. The tank 2 for holding the acid bath 3 may be conveniently located below this floor level, the open top of the tank coinciding with an opening 4 in the floor 1, and the tank being supported on a suitable pedestal 5 arising from the next floor level below. The acid used is, ordinarily, dilute hydrochloric, and the enclosing tank 2 is formed of wood, to resist the action of the acid. Heating means, (not shown), usually steam injected into the acid-bath, is employed to raise the temperature of the glass sheets, so as to accelerate the action of the acid, and also to dry the sheets more quickly when removed from the bath.

Arranged above this tank, preferably as shown in Figs. 1 and 2, is an endless conveyor, comprising a pair of sprocket chains 6 and 7, carried by pairs of sprockets 8, 9, 10, 11 and 12. These sprockets are carried on suitable stud-shafts projecting inwardly from a supporting framework 13. This frame 13 may be mounted on the floor 1, or hung from the overhead structure 14, or partially from both as shown in the drawings. The exact structure of the framework is immaterial, as long as a substantially rigid support for the conveyor system is provided, and may be varied in form to suit the surrounding building conditions.

The pair of sprockets 8 are driven in unison from a pair of gears 15 integral with or secured to the sprockets 8. The gears 15 mesh with a pair of gears 16 on a drive shaft 17, the shaft 17 being driven from a motor 18 through worm 19 and worm-wheel 20.

Suspended at spaced intervals between the chains 6 and 7, is a series of individual sheet carriers 21. In the form of the invention illustrated in Figs. 1 and 2, there are six of these carriers shown respectively in the several positions a, b, c, d, e and f. As these carriers are all alike, a description of one will suffice for all. The carrier is hung freely, by means of a pair of yokes 22, from a shaft 23 carried at its ends in opposite links of the chains 6 and 7. The parts so far mentioned may be of metal, but the remainder of the carrier, which becomes immersed in the acid, is preferably formed of wood. This wooden framework is given as open a construction as practicable, to allow free access of the acid to the glass sheet, and in the example shown comprises three uprights 24, 25 and 26, joined by upper and lower cross-pieces 27 and 28. At the lower end of each upright is a forward extension in which is a sheet holding groove 29, the three grooves 29 being in alignment to form a channel for receiving and supporting the lower edge of the glass sheet. In the central upright 25 is a longitudinal slot 30, in which slides a latch member 31 for holding the upper edge of the sheet. The slot 30 is of considerable length so as to accommodate the latch to various sizes of sheets. The latch 31 has a groove 32 in its lower side to hook over the upper edge of the sheet. A series of bosses or projections 33 may be provided on the uprights 24 and 26 to hold the sheet of glass 35 away from the faces of the uprights and allow freer access of the acid to the sheet face.

In Fig. 5 is illustrated an alternative form of latch member for holding the sheet on the carrier. In this form, the latch 36 is pivoted to the central upright 25, as at 37, and may be swung aside when the sheet is placed on the carrier and will then drop by gravity into sheet holding position. As in the modification first described, the lower edge of the sheet is held in grooves at the lower end of the carrier uprights.

The form of conveyor shown in Figs. 1 and 2 is preferably driven in the direction of the arrows in Fig. 2. The conveyor may be driven continuously at a slow rate of speed, in which case the sheets are placed on and removed from the carriers while they are in motion. In this case the conveyor may be driven from a motor, as shown at 18, or may be geared to the sheet drawing apparatus, or leer conveyor, and driven therefrom.

Or the conveyor may be advanced intermittently, by any suitable mechanism, to allow periods of rest for loading and unloading the carriers. One system of accomplishing this result is indicated in Figs. 1, 2 and 4. A suitable circuit-breaker 38 is located at some convenient point adjacent the path of travel of one of the chains, such as 7 in Fig. 4. This circuit-breaker is normally held closed by a spring 39, but may be broken by any one of a series of cams or bosses 40 placed at intervals along the chain 7. The operating circuit for motor 18 passes through the contacts of circuit-breaker 38. Whenever one one of the bosses 40 comes beneath the projecting arm 41 of the circuit-breaker, the circuit is broken and the motor is stopped. In order to again start the motor, a starting switch 42, which may be of the push-button type, is placed in some position convenient to the workman who loads and unloads the carriers, for example, on one of the uprights of supporting frame 13 as shown in Fig. 1. The wires from this starting switch are shunted around the circuit-breaker. The operator will hold the switch closed for an instant, until the boss 40 has passed out from under arm 41, and the circuit-breaker is again closed. Starting switch 42 may now be released and the conveyor will continue to operate until the next boss 40 has opened the circuit breaker. The conveyor moves forward each time a distance equal to the spacing between successive carriers.

In normal operation of this device, a sheet of glass will be placed on the carrier shown at a, which will usually be the loading position. The sheet on the carrier at d, which has been dipped will now be removed, and the switch 42 is operated to start the conveyor in motion. The carrier at a moves down into the acid bath as at b, and the empty carrier at f moves down into loading position. At this time the boss 40, adjacent the carrier e arrives beneath the arm 41 of circuit breaker 38, and the conveyor is again halted.

In Figs. 6 and 7 are illustrated two other alternative traveling circuits for the conveyors. The form shown in Fig. 7 is substantially a reversal of that shown in Figs. 1 and 2, the carriers being loaded at A and unloaded at B, and the direction of travel being as indicated by the arrows. In the simple form shown in Fig. 6, the carriers are loaded at C and unloaded at D. This latter form might be used in limited spaces which are too small for the other forms, but is less accessible for unloading than the forms shown in Figs. 2 or 7. Obviously, any of these forms would be operable if moved in the opposite direction from that described.

Claims:

1. In an apparatus for dipping sheet glass, a tank containing a liquid bath, an endless conveyor comprising a series of spaced sheet carriers, the conveyor so traveling above the tank that the sheet-carriers are successively lowered into and raised from the liquid bath as they move around the conveyor circuit, and means for intermittently advancing the conveyor to provide loading and unloading intervals for the sheet carriers.

2. In an apparatus for dipping sheet glass, a tank containing a liquid bath, an endless conveyor arranged above but entirely outside of the tank, a series of sheet carriers hung from the conveyor at spaced intervals, the conveyor successively lowering each carrier into the liquid bath and elevating it therefrom, means for driving the conveyor, and means for automatically stopping the conveyor after each carrier has moved forward one interval.

3. In an apparatus for dipping sheet glass, a tank containing a liquid bath, an endless chain conveyor traveling above but entirely outside of the tank, a series of spaced sheet carriers hung freely from the conveyor at spaced intervals, the conveyor circuit comprising a substantially vertical run directly above the tank, whereby the carriers are successively dipped into the liquid bath, a motor for driving the chain conveyor, and means for automatically stopping the motor after each carrier has moved forward one interval.

4. In an apparatus for dipping sheet glass, a tank containing a liquid bath, an endless conveyor, and a series of individual sheet carriers suspended from the conveyor and successively lowered into and raised from the bath as the conveyor moves above the tank, each carrier comprising an upright frame structure, a lower grooved member for supporting the lower edge of the sheet, and an adjustable latch for engaging the upper edge of the sheet.

5. In an apparatus for dipping sheet glass, a tank containing an acid bath, an endless conveyor, and a series of individual sheet carriers suspended from the conveyor and successively lowered into and raised from the bath as the conveyor moves above the tank, each carrier comprising an upright frame structure, a lower grooved member for supporting the lower edge of the sheet, and an adjustable latch for engaging the upper edge of the sheet, all of the carrier parts being non-metallic.

6. In an apparatus for dipping sheet glass, a tank containing an acid bath, an endless metallic chain conveyor, and a series of wooden sheet-carrier frames suspended from the conveyor, the conveyor traveling in such a path above the tank that the carriers and the sheet carried thereby will be successively immersed and withdrawn from the acid bath, but no part of the metallic conveyor will enter the acid.

7. An apparatus for removing a coating from sheet glass, comprising a tank containing an acid solution, an endless conveyor traveling above but outside of the tank, and a plurality of sheet carriers suspended from said conveyor, the conveyor successively lowering each carrier and sheet into the acid bath to remove the coating and then elevating it therefrom.

Signed at Charleston, in the county of Kanawha, and State of West Virginia, this 24th day of December, 1921.

ROBERT P. CALLARD.